UNITED STATES PATENT OFFICE 2,220,357

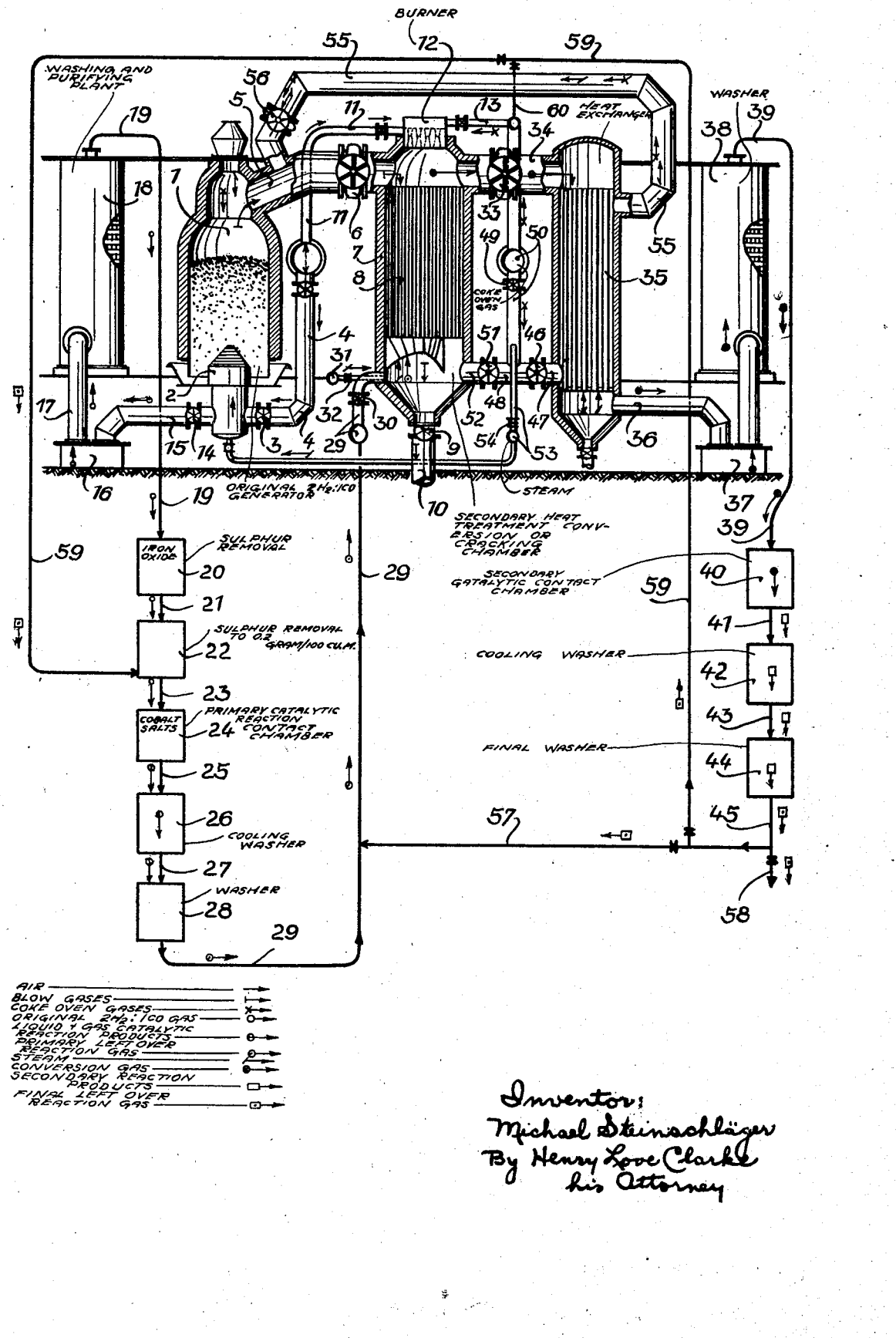

SYNTHETICAL PRODUCTION OF LIQUID HYDROCARBONS FROM CARBON MONOXIDE AND HYDROGEN

Michael Steinschläger, Moers, Niederrhein, Germany, assignor, by mesne assignments, to Koppers Company, Pittsburgh, Pa., a corporation of Delaware Application November 24, 1936, Serial No. 112,549
In Germany November 26, 1935

4 Claims. (Cl. 260—449)

The invention relates to the synthetical production of liquid hydrocarbons by reacting gases containing hydrogen and carbon monoxide, in the presence of catalytic substances, such as cobalt-salts or the like.

By the catalytic treatment of such gases, a certain quantity of gaseous reaction products, reaching from the simplest hydrocarbon methane up to the group of those higher hydrocarbons, which are often called "gasol," is formed, as well as the valuable hydrocarbons which are liquid or solid at normal temperatures and at normal pressure.

In order to increase the yield of valuable liquid or solid hydrocarbons, and to make use of the comparatively less valuable or even undesired gaseous hydrocarbons, it has been suggested to crack the less valuable gaseous hydrocarbons, formed by the catalytic treatment, for instance by introducing them, while still in the left-over reaction gas after separating the more valuable liquid and solid substances, together with steam into water-gas producers, which serve for producing the original gases necessary for the synthesis. The less valuable gaseous hydrocarbons are thereby converted back into hydrogen and carbon monoxide within the water-gas producer, and the conversion products are returned, together with the water-gas originally formed in the producer, to the catalytic treatment.

The main object of my present invention is to provide improvements in the said catalytical treatment of gases for producing hydrocarbons, so that the yield of the more valuable liquids or solid hydrocarbons is further increased and the costs of the catalytical treatment are substantially decreased.

My invention consists principally in subjecting the less valuable gaseous substances formed by and remaining over after the catalytical treatment of the original water gas to a secondary heat treatment, separate from the original water-gas generation step, but in the presence of steam at high temperatures, and in the absence of gases containing sulphur compounds, or of gases not useful for the synthesis of hydrocarbons, with regard to the proportion of carbon monoxide and hydrogen, whereupon the conversion gases formed during such secondary heat treatment are subjected, without further handling (such as purification or the like), to a second catalytical treatment.

This characteristic feature of the process according to my invention offers the advantage, that the original water-gas process is considerably relieved in that the heat used, according to the suggestions made hitherto for the conversion of less valuable left-over hydrocarbons to $2H_2+CO$ by reaction with carbon in the fuel bed of the water-gas generator, is now completely made available for the original water-gas formation. Furthermore, my invention utilizes the fact, that the conversion gases formed during the conversion of the gaseous hydrocarbons contain hydrogen and carbon monoxide in a ratio most favourable for the catalytical synthesis of liquid hydrocarbons.

Another advantage of the invention consists in that the conversion of the hydrocarbons in the absence of sulphur compounds which, as is well known, are always contained in the ordinary water-gas, is carried out in a considerably easier and more complete way. Finally, the comparatively costly complete removal of sulphur and sulphur compounds from the reaction gas before the catalytic treatment can also be avoided. This removal of sulphur compounds before the catalytic treatment is not to be omitted in any case, since the catalysts used for the formation of hydrocarbons from carbon monoxide and hydrogen become ineffective at once, they are in contact with sulphur and sulphur compounds. As in the present case, large quantities of gas have to be dealt with, it is obvious that a considerable reduction in costs will result by avoiding the double purification of the conversion gases. Furthermore, it has also been found, that the synthesis of valuable hydrocarbons from the first reaction gas is more favourable, if according to the present invention, the inerts of the residual gas are not returned together with the water gas to the process, of the catalytic treatment.

The invention further relates to a special method of heating the conversion chamber for the residual reaction gas left-over from the primary catalytic treatment and to a more favourable utilization of the sensible heat from the converted gases, in connection with the water-gas installation, in which the synthesis-gas is produced.

The invention therefore provides for special means in which the secondary heat treatment conversion chamber for the residual or left-over gas, resulting from the first catalytic treatment, is first heated-up with the blow gases of the synthesis-gas producer, whereupon the connection between the synthesis-gas producer and the conversion chamber for the residual or left-over reaction gas is interrupted, so that the residual or left-over reaction gas then can be passed through the hot conversion chamber. My invention further consists in that the hot gases leaving the secondary heat treatment conversion chamber exchange their heat with the steam to be introduced into the synthesis gas generator for the original 2:1 gas formation, or with the mixture of steam and coke-oven gas or other gases containing hydrogen, i. e. residual gases.

Finally, the invention also comprises the utilization of the heat remaining in the secondary heat treatment conversion chamber, when the temperature in the conversion chamber has dropped below the point at which the conversion of hydrocarbons with steam ceases or begins to retard. In this case, the invention provides means to connect, after this time, the conversion chamber again with the original water-gas producer and to introduce the steam necessary for the original water-gas formation into the conversion chamber and to conduct the steam from there into the original water-gas producer.

In the event that the blow-gases of the original water-gas producer are not sufficient for the heating-up of the conversion chamber for the residual or left-over reaction gas, then according to my invention, the conversion chamber can be brought to the desired temperature by an additional heating, by means of gases with a high calorific value, for instance coke-oven gas.

The invention still further provides for a special means for introducing the left-over reaction gases to be converted into the conversion chamber. Preferably this left-over reaction gas together with the highly preheated steam is introduced into such a zone of the conversion chamber, where the temperature lies above the range in which elementary carbon is separated. Still further objects of my invention may be taken from the following description of a preferred embodiment of my invention:

In order that the invention may be more readily understood and carried into practice, reference is hereby made to the accompanying drawing, which illustrates a plant for carrying out the process according to my invention.

The gas necessary for the synthesis of hydrocarbons must contain hydrogen and carbon monoxide in a ratio of $3H_2:1CO$. This proportion is attained by special means, being however of no great interest in this connection. Said gas is originally produced in a water-gas generator 1. The water-gas generator is equipped with an ordinary revolving grate 2. Air is admitted for the purpose of blowing to incandescence the gas producer fuel bed charge through a pipeline 4, fitted with the shut-off valve 3.

The hot blow gases developed during the hot blow period escape at the upper end of the gas producer through the upper pipeline 5, regulated by a shut-off valve 6. The blow gases then enter the conversion chamber 7, which similar to a regenerator is filled with a refractory checkerbrickwork 8 or by another suitable contact material. The blow gases flow downwards in the secondary heat-treatment or conversion cracking chamber 7 and finally reach the waste-gas channel 10, connected below and governed by a shut-off valve 9.

The hot blow gases from the water-gas producer still contain a comparatively large amount of combustible gases. These gases will be burnt with secondary air in the free top space of the conversion or cracking chamber 7. This oxygen is delivered through the pipeline 11 into a burner 12, arranged in the roof of the cracking device 7.

The burner 12 also serves for the additional heating of the conversion chamber 7, as soon as the checkerwork 8 has reached such a temperature, which is to be arrived at by the combustion of the hot blow gases. For this reason, the burner 12 is supplied with coke-oven gas or another suitable gas of a high calorific value through the pipeline 13, which can be closed. If necessary, it may also be of advantage to switch-off the hot blow gas stream by closing the valve 6 and the air valve 3 before the additional heating by the burner 12 is commenced.

After the water-gas producer 1 and the conversion chamber 7 have been brought to the desired temperature, the air valve 3, the waste-gas valve 9 and the valve 6 are closed in the connecting channel 5. Furthermore, the additional air supply 11 and the gas pipeline 13 are likewise closed. Upon a corresponding reversal of the apparatus, which is fully detailed in the following description, steam or a steam-gas mixture will be passed downwards through the water-gas producer 1. The original water-gases thus formed in the water-gas producer will be discharged after opening the shut-off valve 14 through the 2:1 reaction gas pipeline 15 into a collecting main 16, from where they flow through the pipeline 17 to the washing and purifying plant 18. The gas freed from dust and cooled down and mainly consisting of carbon monoxide and hydrogen, now flows through the pipeline 19 into an apparatus 20, in which the main quantity of sulphur compounds is removed by bringing the sulphur compounds into contact with an iron oxide material for the purification of gas. The pre-cleaned gas then runs through the pipeline 21 into an apparatus 22, wherein the sulphur compounds still contained in the gas are reduced to about 0.2 gram/100 cu. m. Thereupon, the gas flows through the pipeline 23 to the primary catalytic reaction contact vessel 24, for the conversion of hydrogen and carbon monoxide into hydrocarbons. The liquid and gaseous products thus formed flow through the pipeline 25 to a cooling washer 26, from where they will pass the pipeline 27 to reach a washer arrangement 28. The hydrocarbons being liquid essentially at normal temperatures and under normal pressures are separated in the washers 26 and 28. The gaseous products which are likewise developed by the catalytic conversion, hereinafter called left-over reaction gas, are extracted from the washer 28 through the pipeline 29.

Said pipeline 29 is controlled by a shut-off valve 30 and is in connection with the lower part of the conversion chamber 7. The end of the pipeline 29 running into the conversion chamber 7 has the shape of injectors and is connected to a steam pipeline 31, governed by a shut-off valve 32.

It has already been mentioned, that the conversion chamber 7 is separated from the water-gas producer 1 during the formation of water-gas by closing the valve 6. As soon as the valve 6 is closed, a valve 33 is opened, which controls the connecting pipeline 34, connecting the conversion chamber with an indirect heat exchanger 35. Thereupon, the inlet valve 30 for the left-over reaction gas and the steam valve 32 are opened, so that a mixture consisting of left-over reaction gas and steam can flow through the conversion chamber 7. When coming into contact with the highly heated surfaces of the checkerwork 8, the hydrocarbons and carbon dioxide, together with steam are converted into carbon monoxide and hydrogen. The conversion gases are leaving through the pipeline 34 into the heat exchanger 35 and from there through a pipeline 36 into a collecting main 37, being of similar design as the collecting main 16. The conversion gases essentially consist of carbon monoxide and hydrogen, generally in the ratio of 1:2. They can, therefore, be used without any objection for the synthesis of hydrocarbons. The conversion gases flow from the collecting main 37 to the cooling washer 38, from where the gases freed from dust and cooled down are forced through the pipeline 39 directly to a secondary contact arrangement 40, for the conversion of hydrogen and carbon monoxide into hydrocarbons. Contrary to the plan shown on the left-hand side of the drawing, illustrating the plant for the conversion of synthesis gas formed in the water-gas producer 1, a special sulphur purification is not necessary for cleaning the conversion gases. The reaction products from the secondary contact arrangement 40 go through the pipeline 41 and reach the cooling washer 42, from where they flow through the pipeline 43 to the final washer 44. The design and operation of the contrivances 42 and 44 are essentially in conformity with the contrivances 22 and 26. The final left-over reaction gas freed from liquid and solid hydrocarbons, is finally discharged through the pipeline 45.

As mentioned above, the hot conversion gases from the conversion or cracking chamber 7 are first led to a heat exchanger 35, for the utilization of the sensible heat. In the heat exchanger 35, the conversion gas transfers its heat to steam or to a mixture of steam and coke-oven gas, which is introduced into the generator 1, for the formation of the original water-gas. For this purpose, the heat exchanger 35 is provided with a lower inlet 47, regulated by a shut-off valve 46. The shut-off valve 46 is also in connection with a T-shaped pipe 48, which, on the one hand is in connection with the coke-oven gas pipeline 50 by the shut-off valve 49, and on the other hand, with a second lower inlet 52 of the conversion plant 7, by the shut-off valve 51. Into the pipe 48 further leads a steam pipeline 53, governed by the shut-off valve 54.

For the utilization of the heat from the hot conversion gases within the heat exchanger 35, the shut-off valve 46 and the steam shut-off valve 54 are opened and, if necessary, also the coke-oven gas valve 49 in case coke-oven gas is likewise added to the reaction steam to be used in the water-gas producer. The steam, or the steam-gas mixture, rises upwards in the tubes of the heat exchanger 35, which are warmed up inside by the hot conversion gases. The steam, or the steam-gas mixture, then flows through the pipeline 55, which by means of the shut-off valve 56 is in connection through the pipeline 5, with the upper part of the shaft of the water-gas producer 1. In other words, steam, or the steam-gas mixture, is introduced into the water-gas producer 1, which medium has been preheated in the heat exchanger 35.

As soon as the temperature in the conversion chamber 7 has dropped below the point at which the conversion of steam with hydrocarbons is finished or is retarded uneconomically, the supply of left-over reaction gas and steam is interrupted by closing the valves 30 and 32. The shut-off valve 33 is then closed and the shut-off valve 6 is opened, so that the conversion chamber 7 is again in communication with the water-gas producer 1. Steam, or a steam-gas mixture, is now led through the conversion chamber in that the shut-off valve 46 leading to the heat exchanger 35 is closed and the shut-off valve 51 is opened. Simultaneously, the valve 56 is closed, which shuts off the connecting pipeline 55, leading to the gas producer 1.

The steam, or the steam-gas mixture, is heated-up by the checkerwork of the conversion chamber 7, before it flows over to the water-gas generator. In this way, the heat which cannot be used for the cracking process on account of the lower temperature range is utilized in this case for the formation of water-gas.

The process of the plant shown on the drawing can of course be varied according to the conditions which have to be observed in the various parts of the plant; the process described before is, however, a preferred embodiment of my present invention.

In order to avoid the separation of elementary carbon inside the conversion chamber 7, or to reduce the amount of separation as far as possible, it may be preferable to introduce the left-over reaction gas along with the highly heated steam together into the conversion chamber. By this it is possible to raise the hydrocarbons suddenly to a temperature which lies above the range of the formation of carbon. For the same reason it may under certain circumstances be of advantage not to introduce the mixture of steam and reaction gas underneath the checkerwork 8, but into a middle zone of the reaction checkerwork, that is, at such a point, at which the temperature lies above the range necessary for the formation of carbon.

It may also be mentioned, that the final left-over reaction gas to be extracted from the pipeline 45 can again be returned to the left-over reaction gas and steam mixture through the pipeline 57, which is connected with the pipeline 29, in order to subject the hydrocarbons still contained in the final left-over reaction gas again to the conversion process and to the catalytic treatment. In such a case, a portion of the final left-over gas is continuously or intermittently drawn off from the process through the pipeline 58, in order to avoid an excessive enrichment of the inerts in the residual or left-over reaction gas in the pipeline 29.

Moreover, it will also be possible to make use of the final residual gas leaving the pipeline 45 through pipeline 59 in washer 22 or to use that quantity of gas to be removed from the gas stream as a heating medium for the burner 12 for the secondary conversion chamber. For this purpose the pipeline 59 is in connection with the burner gas pipeline 13, through a flare pipeline 60. The final residual gas can also be used for the heating of the fine purification washer 22, which is connected with the pipeline 59, as shown on the drawing.

When carrying out the process according to my invention, the conversion chamber 7 is brought to a temperature of about 1000–1500° C., for example to a temperature of 1300° C., before introducing the left-over reaction gas to be cracked. At this temperature, the hydrocarbons are converted with steam into carbon monoxides and hydrogen. Similarly, the carbon dioxide contained in the reaction gas also reacts with the steam. The left-over gases to be converted are introduced into a middle zone of the checkerwork 8 of the secondary cracking chamber 7, together with steam preferably preheated to a temperature of 750° C.

After the conversion, the temperatures in the cracking chamber 7 lies above say 800° C.

Whereas with the processes hitherto known for producing hydrocarbons from gases containing carbon monoxides and hydrogen, about 100 kilos of liquid products and about 300 cu. m. residual gas are recovered from 1000 cu. m. synthesis gas, the yield of liquid products according to the process described before is increased to 160 kilos, and the fuel consumption does however not rise by 60% but only by 10–15%.

I have now described my present invention on the lines of a preferred embodiment thereof, but my invention is not limited in all its aspects to the mode of carrying out as described and shown, since the invention may be variously embodied within the scope of the following claims.

I claim:

1. A process for making liquid hydrocarbons by catalytically reacting $2H_2$ and $1CO$ by means of a known catalyst capable of forming liquid hydrocarbons from $2H_2$ and $1CO$, which comprises: making alternate blows of air and runs of water-gas-making steam through a generator fuel bed of carbonaceous fuel to produce original water-gas containing $H_2$ and $CO$ in ratio 2:1; during the blows, storing the heat of the spent blow gases in a conversion chamber separate from the generator fuel bed; during the runs, purifying the original 2:1 gas and then catalytically reacting it in the presence of a catalyst known to be capable of reacting $2H_2$ and $1CO$ to liquifiable hydrocarbons in a primary catalytic reaction chamber to form the liquid hydrocarbons from the 2:1 ratio of $H_2$ to $CO$, removing the liquid and solid products from the reaction gas left-over from the primary catalytic reaction, and then flowing the residual left-over reaction gas together with the steam by themselves through the aforesaid conversion chamber and converting the gaseous hydrocarbons in the left-over gas reaction gas to $H_2$ and $CO$ in ratio 2:1 by the heat stored in the conversion chamber from the blow gases of the previous "blow" of the generator fuel bed, thereafter catalytically reacting the so converted $2H_2:1CO$ in the left-over reaction gas in the presence of a catalyst as aforesaid in a secondary catalytic reaction chamber separate from the primary catalytic reaction chamber to form further liquid hydrocarbons from the left-over gas, and recovering the further liquid hydrocarbons from the reaction gases of the secondary catalytic reaction chamber.

2. A method as claimed in claim 1 and which includes the step of passing the steam or steam-gas mixture flowing to the generator fuel bed for the runs of original water gas therein in indirect heat exchange relation with the left over conversion gas as it issues from the separate cracking chamber therefor and before the left-over conversion gas reaches the secondary catalytic reaction chamber, to preheat the steam or steam-gas mixture for the runs of original water-gas by the residual heat of the converted left-over gas.

3. A method as claimed in claim 1 and in which the steam and hydrocarbon vapors for the runs of original water-gas comprise steam and coke oven gas, and in which the steam and coke oven gas flowing to the generator fuel bed for the runs of original water-gas therein are passed, before entering the fuel bed, in indirect heat exchange relation with the left-over conversion gas as it issues from the cracking chamber therefor and before the converted left-over gas reaches the secondary catalytic reaction chamber.

4. A method as claimed in claim 1 and in which the steam and hydrocarbon vapors for the runs of original water-gas comprise steam and coke oven gas, and in which the steam and coke oven gas flowing to the generator fuel bed for the runs of original water-gas therein are passed, before entering the fuel bed, in indirect heat exchange relation with the left-over conversion gas as it issues from the cracking chamber therefor and before the converted left-over gas reaches the secondary catalytic reaction chamber and in which the residual left-over reaction gas from the secondary catalytic reaction chamber is conveyed to and burnt to heat the conversion chamber and the sulphur purification step.

MICHAEL STEINSCHLÄGER.